(12) United States Patent
Ramamurthy

(10) Patent No.: US 10,791,062 B1
(45) Date of Patent: Sep. 29, 2020

(54) INDEPENDENT BUFFER MEMORY FOR NETWORK ELEMENT

(71) Applicant: Amazon Technologies, Inc., Seattle, WA (US)

(72) Inventor: Pratap Ramamurthy, Fremont, CA (US)

(73) Assignee: Amazon Technologies, Inc., Seattle, WA (US)

( * ) Notice: Subject to any disclaimer, the term of this patent is extended or adjusted under 35 U.S.C. 154(b) by 22 days.

(21) Appl. No.: 15/812,972

(22) Filed: Nov. 14, 2017

(51) Int. Cl.
*H04L 12/835* (2013.01)
*H04L 12/801* (2013.01)

(52) U.S. Cl.
CPC .............. *H04L 47/30* (2013.01); *H04L 47/12* (2013.01)

(58) Field of Classification Search
None
See application file for complete search history.

(56) References Cited

U.S. PATENT DOCUMENTS

| | | | | |
|---|---|---|---|---|
| 2004/0095882 A1* | 5/2004 | Hamzah | ................... | H04L 47/10 370/229 |
| 2006/0039390 A1* | 2/2006 | Boyd | ................... | H04L 12/4641 370/404 |
| 2007/0153802 A1* | 7/2007 | Anke | ..................... | H04L 47/10 370/395.42 |
| 2009/0327826 A1* | 12/2009 | Inoue | .................... | H04L 1/0072 714/748 |
| 2012/0250514 A1* | 10/2012 | Hiramoto | .............. | H04L 45/121 370/237 |
| 2013/0346531 A1* | 12/2013 | Hummel | ............. | G06F 13/4022 709/212 |
| 2017/0308321 A1* | 10/2017 | Kumagai | ................ | G06F 12/00 |
| 2017/0339062 A1* | 11/2017 | Mayer-Wolf | ........... | H04L 47/12 |
| 2018/0026907 A1* | 1/2018 | Miller | .................... | G06F 3/0613 709/226 |
| 2018/0210765 A1* | 7/2018 | McCormick | ........ | G06F 9/45504 |
| 2019/0155762 A1* | 5/2019 | Kubala | ............... | G06F 13/1673 |

* cited by examiner

*Primary Examiner* — Ruihua Zhang
(74) *Attorney, Agent, or Firm* — Thorpe North & Western, LLP.

(57) ABSTRACT

Technology is described for forwarding packets from a network element to a buffer node. A packet may be received at the network element. The network element may determine that packets stored in the buffer memory exceed a defined threshold for data size. The packet may be forwarded from the network element to the buffer node in a service provider environment for storage of the packet at the buffer node. The network element may receive the packet from the buffer node.

20 Claims, 12 Drawing Sheets

INDEPENDENT BUFFER MEMORY FOR NETWORK ELEMENT

BACKGROUND

A network device may receive packets and temporarily store the packets in a buffer memory, when routing the packets to a designated destination using a packet address. In one example, the network device may process packets on a first-in first-out (FIFO) basis, and the packets may be forwarded to the appropriate destination using a best-effort packet forwarding mechanism. In other words, the network device may process the packets without providing a guarantee that the packets will be successfully delivered to the appropriate destination. For instance, the best-effort packet forwarding mechanism may permit the network device to drop packets when the buffer memory is full. The network device may be more likely to drop packets during times of network congestion. Therefore, when the buffer memory of the network device is insufficient to adequately handle increased traffic during busy times of day, network performance may be degraded.

In one example, datacenter networking speeds have rapidly grown in recent years. For example, network speeds have grown from 10 gigabits per second (10G) to 40G to 100G, and next generation datacenter networking speeds are expected to be 400G and above. The network speed of 400G may correspond to a single port, and one network device may include tens or hundreds of ports. Therefore, a single network device may process terabytes of data or more every second. While the network transport links may be able to handle these increased network speeds, it may be difficult for hardware in the network device (e.g., the buffer memory in the network device) to scale up to handle these increased network speeds.

DETAILED DESCRIPTION

Figure 1A:
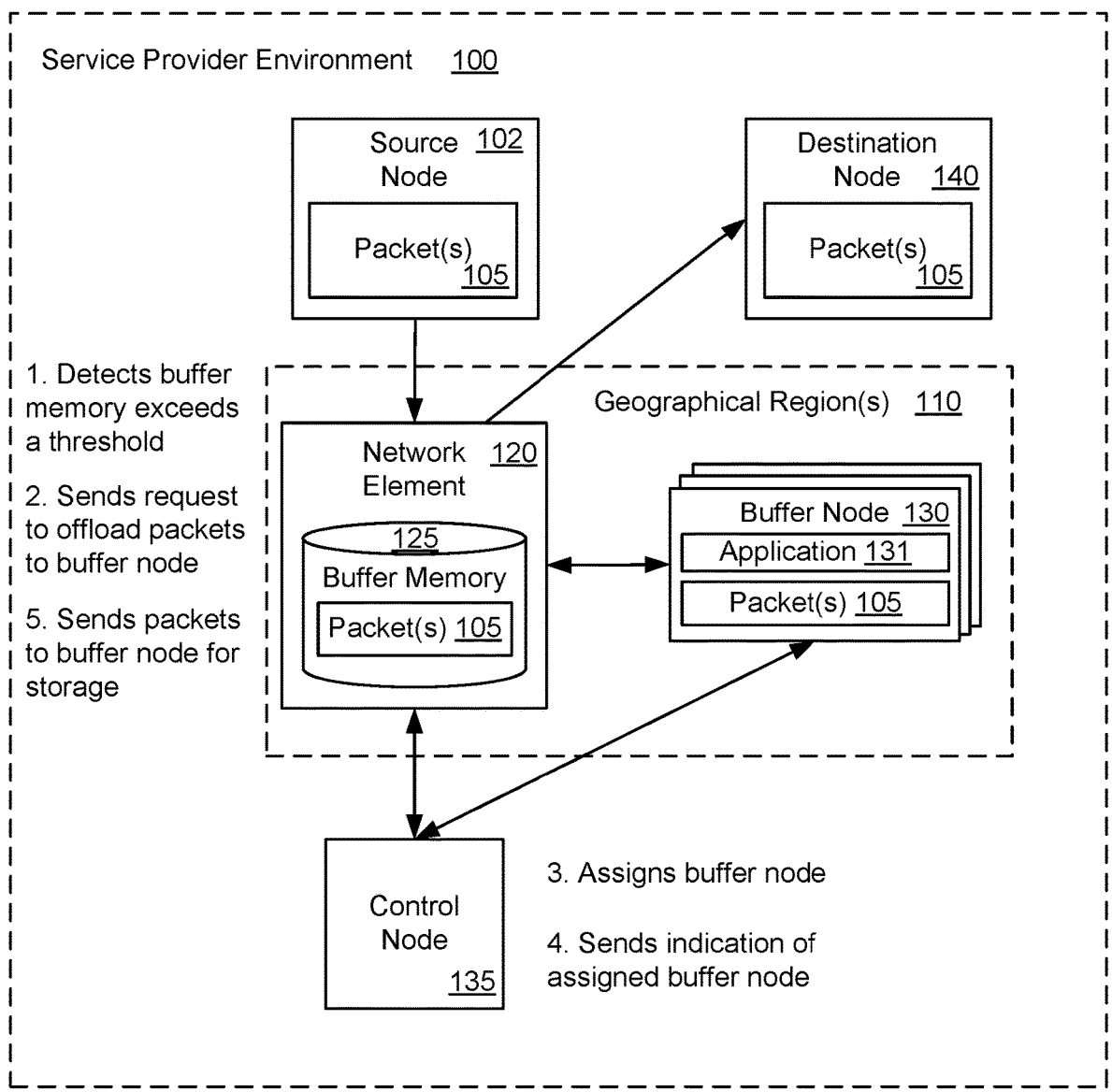
FIG. 1A illustrates a system and related operations for sending packets from a network element to a buffer node for temporary storage of the packets at the buffer node according to an example of the present technology.

Technologies are described for providing an external buffer memory for a network element, such as a physical network element (e.g., physical network switches, physical routers, firewalls) or a virtual network element (e.g., virtual switches, virtual routers) in a service provider environment. The external buffer memory in buffer node(s) may temporarily store packets for the network element when a buffer memory in the network element has reached a local maximum limit. The external buffer memory may be included in the buffer node(s) running in the service provider environment. The external buffer memory in the buffer node(s) may be elastic (e.g., dynamically adjustable) depending on a current level of network traffic that flows through the network element. Therefore, the external buffer memory in the buffer node(s) may enable the network element to handle an increased amount of network traffic without overflowing the buffer memory in the network element. In addition, the ability to offload packets from the network element to the buffer node may reduce a likelihood of packets being dropped at the network element due to potential overflows at the buffer memory of the network element.

In one example, the network element may detect when a data size of packets (or a group of packets) stored in the buffer memory of the network element exceeds a defined threshold. For example, the size of the buffer memory may be fixed or limited in the network element, and during network congestion (in which links in the network are congested for seconds, minutes or sometimes longer) or due to microbursts (sudden increases in traffic for a limited amount of time, on the order of milliseconds), the data size of the packets stored in the buffer memory may exceed the defined threshold.

As a result of a detected packet or packets that exceed memory storage constraints, the network element may send a request to a control node (or control service) in the service provider environment to identify an ability to offload packets from the network element to a buffer node in the service provider environment. The buffer node may be a server (e.g., a bare-metal server that executes an operating system or buffer functions on an operating system). Alternatively, the buffer node may be a computing instance (e.g., a computing instance or virtual instance on a hypervisor). The buffer node may serve to temporarily store the packets on behalf of the network element and relieve overflow at the buffer memory of the network element. After receiving the request from the network element, the control node may assign a buffer node to temporarily store packets for the network element. The control node may launch a new buffer node for this purpose, or alternatively, the control node may select a buffer node that is already running. For example, a buffer node may be available that is already serving another network element and is capable of temporarily storing packets for additional network elements. Alternatively, an unused buffer node may be waiting in a warming pool to service requests to temporarily store packets. The control node may send an indication about the assigned buffer node to the network element. The indication may include information (e.g., an address of the assigned buffer node) that enables the network element to send packets to the buffer node.

In one example, after receiving the indication from the control node, the network element may begin sending packets to the buffer node for temporary storage at the buffer node. In other words, rather than locally storing the packets in the buffer memory of the network element, the network element may send the packets to the buffer node for storage. After a defined duration of time or a defined event, the network element may send a request to the buffer node to retrieve certain packets from the buffer node. For example, the network element may request certain packets back from the buffer node when a data size of packets stored in the buffer memory has reduced to below the defined threshold. As a non-limiting example, the defined period of time after which the network element requests certain packets back from the buffer node may be on the order of milliseconds or seconds. The buffer node may receive the request from the network element, and the buffer node may send the packets back to the network element.

FIG. 1A illustrates an exemplary system and related operations for sending packets 105 from a network element 120 to a buffer node 130 for temporary storage of the packets 105 at the buffer node 130. The network element 120 and the buffer node 130 may be included in a service provider environment 100. In a specific example, the network element 120 may be located in a data center in the service provider environment 100. The buffer node 130 may be a server (e.g., a bare-metal server that executes an operating system or buffer functions on an operating system). Alternatively, the buffer node 130 may be a computing instance (e.g., a computing instance or virtual instance on a hypervisor on a server). The network element 120 may be a physical network switch, a physical router, a firewall, a virtual network switch or a virtual network router. In addition, the buffer node(s) 130 may include memory to temporarily store the packets 105 received from the network element 120. The memory in the buffer node(s) 130 may be elastic (e.g., may be dynamically adjusted) depending on a number of packets 105 and/or a data size of packets 105 received from the network element 120.

In one example, the network element 120 may receive packets 105 from a source node 102. The network element 120 may function to direct or route the packets 105 to an appropriate destination node 140. The source node 102 and the destination node 140 may be within the service provider environment 100 and/or outside the service provider environment 100. The network element 120 may locally store the packets 105 in a buffer memory 125 of the network element 120. For example, the packets 105 may be locally stored in the buffer memory 125 while the network element 120 performs a lookup to determine an appropriate route to deliver the packets 105 to the destination node 140. After the lookup is performed, the packets 105 may be retrieved from the buffer memory 125 and routed to the destination node 140. The buffer memory 125 in the network element 120 may include a defined amount of memory (e.g., one or two terabytes (TB) of memory). The buffer memory 125 may include an amount of memory that is sufficient to store a defined duration of network traffic at a given time (e.g., the buffer memory 125 may store up to a few seconds of network traffic at a given time).

In one example, the network element 120 may detect when a data size of packets 105 (or a group of packets 105) stored in the buffer memory 125 of the network element 120 exceeds a defined threshold. As non-limiting examples, the network element 120 may detect when the buffer memory 125 is 90% full or 95% full, which may exceed the defined threshold for the buffer memory 125. As an example, the data size of the packets 105 stored in the buffer memory 125 may exceed the defined threshold during network congestion, in which links in the network may be congested for seconds, minutes or sometimes longer. As another example, the data size of the packets 105 stored in the buffer memory 125 may exceed the defined threshold during microbursts, which may involve sudden increases in traffic for a reduced amount of time, such as on the order of milliseconds (ms). During network congestion or microbursts in the service provider environment 100, a packet queue in the buffer memory 125 of the network element 120 may be filled to a local limit (or relatively close to the local limit).

In one configuration, when the data size of the packets 105 stored in the buffer memory 125 exceeds the defined threshold, the network element 120 may send a request to a control node 135 (or a control service) in the service provider environment 100 to obtain information to offload packets 105 from the network element 120 to a buffer node 130 in the service provider environment 100. The buffer node(s) 130 may serve to temporarily store packets 105 on behalf of the network element 120 and relieve overflow of the buffer memory 125 in the network element 120. The buffer node(s) 130 may enable the network element 120 to handle temporary increases in an amount of network traffic, and the network element 120 may have improved congestion handling due to the ability to offload packets 105 to the buffer node 130, thereby virtually expanding the buffer memory 125 of the network element 120.

In one example, the control node 135 may receive the request from the network element 120. The control node 135 may assign a buffer node 130 to the network element 120 to temporarily store packets 105 for the network element 120. For example, the control node 135 may launch a new buffer node 130 for storing packets 105 received from the network element 120. As another example, the control node 135 may select a buffer node 130 that is already running and available to store packets 105 on behalf of the network element 120 (e.g., a buffer node from a warm pool of buffer nodes). In yet another example, the control node 135 may select a buffer node 130 that is already serving another network element and is capable of temporarily storing packets 105 for additional network elements, such as the network element 120. In some cases, it may be more efficient to utilize a buffer node 130 that is already running as opposed to launching a new buffer node 130. For example, for a microburst that may last for 5 milliseconds (ms), launching a new buffer node 130 may be more time consuming than the microburst itself, so it may be desirable to utilize a running buffer node 130. In one example, the buffer node(s) 130 may be dedicated buffer nodes that function to serve the network element 120, or alternatively, the buffer node(s) 130 may be non-dedicated buffer nodes that perform multiple functions (e.g., storing other data, as well as storing packets 105 for the network element 120).

In one configuration, after assigning the buffer node 130 to store packets 105 on behalf of the buffer memory 125, the control node 135 may send an indication about the assigned buffer node 130 to the network element 120. The indication may include information that enables the network element 120 to send packets 105 to the buffer node 130. For example, the information may include an address of the assigned buffer node 130, which may enable the network 120 to send packets 105 to the buffer node 130.

In an alternative configuration, the control node 135 may automatically assign the buffer node 130 to the network element 120 using an expected traffic pattern in the service provider environment 100. Expected traffic patterns may indicate expected spikes or declines in network traffic based on historical traffic data. As a non-limiting example, the control node 135 may automatically assign the buffer node 130 to the network element 120 at 7 PM every day based on an expected increase in network traffic at this time. The expected traffic patterns in the service provider environment 100 may be determined over a period of time using machine learning, artificial intelligence, pattern recognition, heuristics, or other suitable techniques. The control node 135 may be provided information about the expected traffic patterns from an external source, and the control node 135 may automatically assign the buffer node 130 to the network element 120 accordingly.

In one example, after receiving the indication from the control node 135, the network element 120 may begin sending packets 105 to the buffer node 130. The buffer node 130 may receive the packets 105 from the network element 120, and via an application 131 that runs at the buffer node 130, the buffer node 130 may locally store the packets 105 in memory at the buffer node 130. Thus, the buffer node 130 may serve as an external buffer memory for the network element 120. By sending the packets 105 to the buffer node 130, the network element 120 may avoid a memory overflow in the buffer memory 125 in the network element 120 which might result in dropping of packets. This additional space in the buffer memory 125 may enable the network element 120 to process an increased amount of packets 105. In addition, by offloading packets 105 to the buffer node 130, the network element 120 may be less likely to drop packets 105 due to potential memory overflow at the buffer memory 125, thereby improving network performance.

In an alternate example, the network element 120 may send the packets 105 to a hardware offload device for temporary storage. The hardware offload device may be a network card or expansion card that is associated with the network element 120 and/or the buffer node 130. In a specific example, the hardware offload device may be a Peripheral Component Interconnect Express (PCI-E) card installed in the network element and/or the buffer node 130 that provides for additional data storage. The hardware offload device may include a fixed amount of memory to temporarily store the packets 105.

In one example, the packets 105 that are forwarded to the buffer node 130 may include a flag to indicate that the packets 105 are buffer overflow packets, as opposed to general network communications. In other words, the network element 120 may include the flag in the packets 105 before sending the packets 105 to the buffer node 130. The buffer node 130 may receive the packets 105, and based on the flag indicating that the packets 105 are buffer overflow packets, the buffer node 130 may determine to store the packets 105 in memory at the buffer node 130.

In another example, the packets 105 that are forwarded to the buffer node 130 may be sent to a designated port at the buffer node 130. The buffer node 130 may determine that the packets 105 that are received at the designated port are buffer overflow packets, and the buffer node 130 may store the packets 105 in memory at the buffer node 130.

In yet another example, the packets 105 may be sent to the buffer node 130 using application programming interface (API) calls to a managed service in the buffer node 130. The buffer node 130 may determine that the received packets 105 are buffer overflow packets, and the buffer node 130 may store the packets 105 in memory at the buffer node 130.

In one example, the packets 105 may be sent to the buffer node 130 at a networking layer at which the network element 120 operates. For example, the network element 120 may be a layer 2 (L2) device, a layer 3 (L3) device or a layer 4 (L4) device. Therefore, when the network element 120 is an L2 device, the network element 120 may send L2 type packets to the buffer node 130, and so on. In addition, if the network element is an L1 device then L1 type packets at the data link layer may be sent to the buffer node 130.

As a non-limiting example, the buffer memory 125 may be 95% full prior to the network element 120 sending packets 105 to the buffer node 130, but after the network element 120 begins sending packets 105 to the buffer node 130, the buffer memory 125 may gradually become 50% full after a period of time. As a result, the network element 120 may process an increased number of packets without the risk of overflow at the buffer memory 125.

In one example, the network element 120 and the buffer node 130 may be located in a same geographical region 110 (or availability zone) to minimize latency when packets 105 travel between the network element 120 and the buffer node 130. Alternatively, the network element 120 and the buffer node 130 may be located in adjacent geographical regions 110. A relatively close proximity between the network element 120 and the buffer node 130 may reduce a transmit time from the network element 120 to the buffer node 130, and vice versa. In one example, a number of hops between the network element 120 and the buffer node 130 within the same geographical region 110 or adjacent geographical regions 110 may be below a defined threshold. For example, the network element 120 may be located one or two hops away from the buffer node 130 to minimize the latency when packets 105 travel between the network element 120 and the buffer node 130. When the network element 120 is located an increased number of hops away from the buffer node 130, then transferring packets 105 between the network element 120 and the buffer node 130 may increase traffic congestion and increase latency for a network element, as the packets 105 are traversing an increased number of network elements due to the increased number of hops.

In one example, after the defined threshold has been reached and a buffer node 130 is assigned to the network element 120, the network element 120 may begin forwarding all subsequently received packets 105 to the buffer node 130. Alternatively, the network element 120 may begin sending some packets 105 to the buffer node 130, while other packets 105 may be locally stored in the buffer memory 125 of the network element 120. For example, the network element 120 may send packets 105 of an increased priority level to the buffer node 130, while packets 105 of a reduced priority level may be locally stored at the buffer memory 125 in the network element 120. In other words, higher priority packets may be sent to the buffer node 130 to reduce the likelihood of these higher priority packets being dropped at the network element 120, while lower priority packets that are stored in the buffer memory 125 may have an increased likelihood of being dropped due to potential overflow at the buffer memory 125.

In one example, the network element 120 may determine whether to send a specific packet 105 to the buffer node 130 based on a packet attribute associated with the packet 105. As an example, the packet attribute may include a number of hops that the packet 105 traversed to arrive at the network element 120. For example, the network 120 may determine to send the packet 105 to the buffer node 130 for temporary storage based on the number of hops the packet 105 has traveled (as indicated in the packet attribute) in relation to a defined threshold. In another example, the network element 120 may determine to send certain types of packets 105 to the buffer node 130. For example, the network element 120 may send transmission control protocol (TCP) packets to the buffer node 130 and not send user datagram protocol (UDP) packets to the buffer node 130.

In another example, due to increased network speeds, the buffer memory 125 may sometimes be insufficient in size to store every one of the packets 105 being received at the network element 120, and as a result, the packets 105 may be more susceptible to being dropped. The dropping of packets may negatively affect the performance of applications, and even applications that are more resilient to packet drops may experience improved performance with no or minimal packet drops. Therefore, the buffer memory 125 in the network element 120 may be augmented or supplemented by memory in the buffer node 130, effectively increasing the capacity of the buffer memory 125 in the network element 120 and enabling the network element 120 to process an increased amount of network traffic with a reduced likelihood of dropping packets at the network element 120.

In one example, the network element 120 may send packets 105 to the buffer node 130 via a dedicated port or a prioritized port of the network element 120 that is selected for use when a data size of packets 105 stored in the buffer memory 125 exceeds the defined threshold. Generally speaking, the network element 120 may be unable to send packets 105 to the buffer node 130 when all ports of the network element 120 are busy due to network congestion and/or packet microbursts in the service provider environment 100. Accordingly, the prioritized port of the network element 120 may prioritize packets 105 being sent to the buffer node 130, as opposed to other types of traffic. The prioritized port of the network element 120 may function to forward packets to the buffer node 130. Therefore, the usage of the dedicated port or the prioritized port of the network element 120 may ensure that the packets 105 are successfully sent to the buffer node 130 over a non-congested or non-saturated network link.

In one example, the network element 120 may send packets 105 to the buffer node 130 via a dedicated network link. The network element 120 may send the packets 105 over the dedicated network link to ensure that the packets 105 are successfully received at the buffer node 130. Alternatively, the network element 120 may identify a network link with a reduced congestion level from a plurality of network links, and the network element 102 may send the packets 105 over that network link to the buffer node 130. By using the dedicated network link or the network link with the reduced congestion level, the packets 105 may be successfully received at the buffer node 130.

In one example, the network element 120 may experience additional latency (e.g., a few ms or even 100-20 ms) for some packets due to usage of the buffer node 130. For example, sending/receiving packets 105 to/from the buffer node 130 may add latency at a microsecond/millisecond level for those buffered packets. In addition, storing and retrieving packets 105 from memory at the buffer node 130 may add additional latency. However, the network element 120 may send packets 105 to the buffer node 130 during times of network congestion and/or microbursts, during which an increased number of packets 105 would otherwise be dropped or delayed. Therefore, the usage of the buffer node 130 may actually reduce end-to-end network latency because packet droppings may create additional latency as compared to sending/receiving packets 105 to/from the buffer node 130.

In one example, the usage of the buffer node 130 to act as an external buffer memory for the network element 120 may mitigate two potential bottlenecks for network traffic that passes through the network element 120. A first bottleneck may involve a central processing unit (CPU) layer in the network element 120. The CPU layer may include the CPU, memory and a storage disk. The memory in the CPU layer may be used to run an operating system and network protocol, such as border gateway protocol (BGP), open shortest path first (OSPF) protocol, etc. The first bottleneck in the CPU layer may involve a capacity to switch or route packets 105 that are arriving at the CPU layer of the network element 120. During times of network congestion and/or microbursts, the CPU layer may be unable to switch or route packets 105 as fast as the packets are arriving at the network element 120. Thus, the usage of the buffer node 130 as an external buffer memory for the network element 120 may mitigate the first bottleneck involving the CPU layer in the network element 120.

A second bottleneck may involve a data layer in the network element 120. The data layer (also referred to as a data fabric layer) may include a network switching application-specific integrated circuit (ASIC) and transceivers and the buffer memory 125 (or buffer bank). The buffer memory 125 in the data layer may be used to store a packet payload. The second bottleneck in the data layer may involve having sufficient buffer memory space to store packets 105 received at the network element 120. Thus, the usage of the buffer node 130 as an external buffer memory for the network element 120 may mitigate the second bottleneck involving the data layer in the network element 120

In one example, when the network element 120 is oversubscribed, there may be insufficient CPU power to switch or route packets 105 when the packets 105 are being received at a maximum rate at most or all ports of the network element 120 (e.g., the network element 120 may have 20, 40 or 96 ports). Since the network element 120 generally does not have the CPU power to switch or route the packets 105 received at the network element 120, the packets 105 may be stored in the buffer memory 125 in the data layer during the switching or routing process.

In one configuration, the control node 135 may assign additional buffer nodes 130 to the network element 120 (or remove buffer nodes 130) depending on a congestion level of the network element 120. In other words, the control node 135 may perform auto scaling of the buffer nodes 130 depending on the congestion level of the network element 120. When the congestion level of the network element 120 is still relatively high, the control node 135 may assign additional buffer nodes 130 to further reduce the burden on the buffer memory 125 of the network element 120. As an example, when the network element 120 is sending packets 105 to a first buffer node, but the buffer memory 125 in the network element 120 is still relatively full and is not sufficiently decreasing using the first buffer node, the control node 135 may assign a second buffer node for the network element 120. The second buffer node may include an increased amount of memory, a decreased amount of memory or a same amount of memory as compared to the first buffer node. The network element 120 may send packets 105 to either the first buffer node and/or the second buffer node, which may relieve overflow at the buffer memory 125. Therefore, the buffer nodes 130 may serve as an external elastic buffer memory for the network element 120, as the buffer nodes 130 (and corresponding memory) may be dynamically added or removed depending on the level of congestion at the network element 120.

In one configuration, the network element 120 may forward packets 105 to a single buffer node. A network interface controller (NIC) in the network element 120 may make a decision to forward a group of packets (e.g., 100 packets) to the single buffer node. In other words, in this example, a decision to send packets 105 is not made at a packet level. Rather, the decision may be made at a packet group level. The NIC may make the decision for the group of packets as a whole, and then the NIC may begin processing the group of packets in parallel for transmission to the single buffer node. In an alternative configuration, the network element 120 may forward packets 105 to one of multiple buffer nodes. In other words, the network element 120 may utilize multiple external buffer memories in multiple buffer nodes, respectively. Therefore, the NIC in the network element 120 may make a decision to send packets 105 at a packet level. For example, the NIC in the network element 120 may make a decision to send a specific packet 105 to one of three buffer nodes in the service provider environment 100.

In one configuration, the buffer node 130 may function as an external elastic buffer memory for multiple network elements in the service provider environment 100. For example, the multiple network elements may be included in a data center in the service provider environment 100. Therefore, the buffer node 130 may receive packets from multiple network elements, and the buffer node 130 may temporarily store the packets on behalf of the multiple network elements. In this case, the buffer node 130 may have sufficient memory to store packets received from the multiple network elements.

Figure 1B:
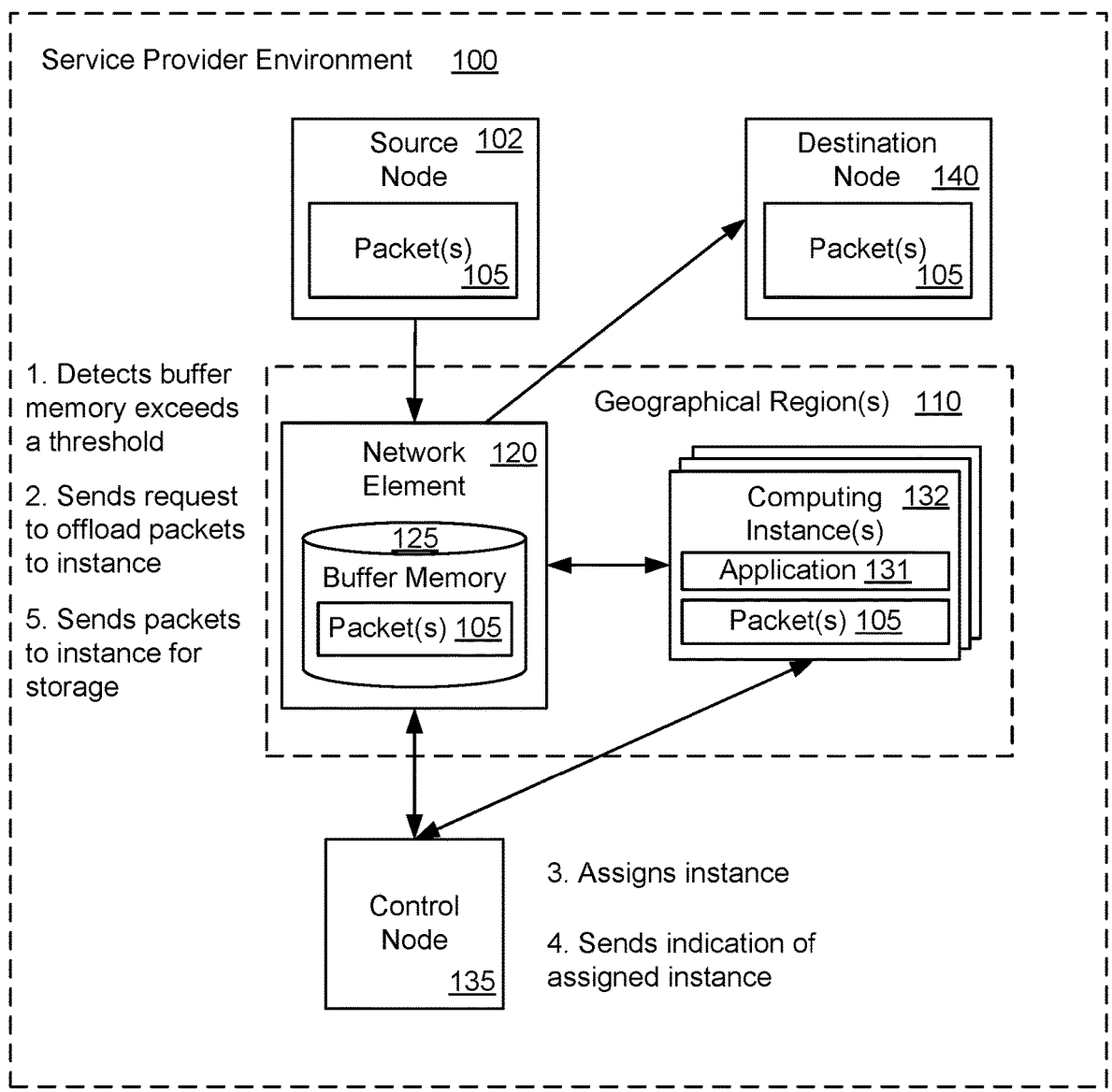
FIG. 1B illustrates a system and related operations for sending packets from a network element to a computing instance for temporary storage of the packets on the computing instance according to an example of the present technology.

FIG. 1B illustrates an example of a system and related operations for sending packets 105 from a network element 120 to a computing instance 132 for temporary storage of the packets 105 on the computing instance 132. The network element 120 may send the packets 105 to the computing instance 132 when a buffer memory 125 of the network element 120 has reached a defined fullness threshold. The computing instance 132 may receive the packets 105 from the network element 120, and the computing instance 132 may locally store the packets 105 at the computing instance 132 via an application 131 that runs in the computing instance 132.

Figure 2:
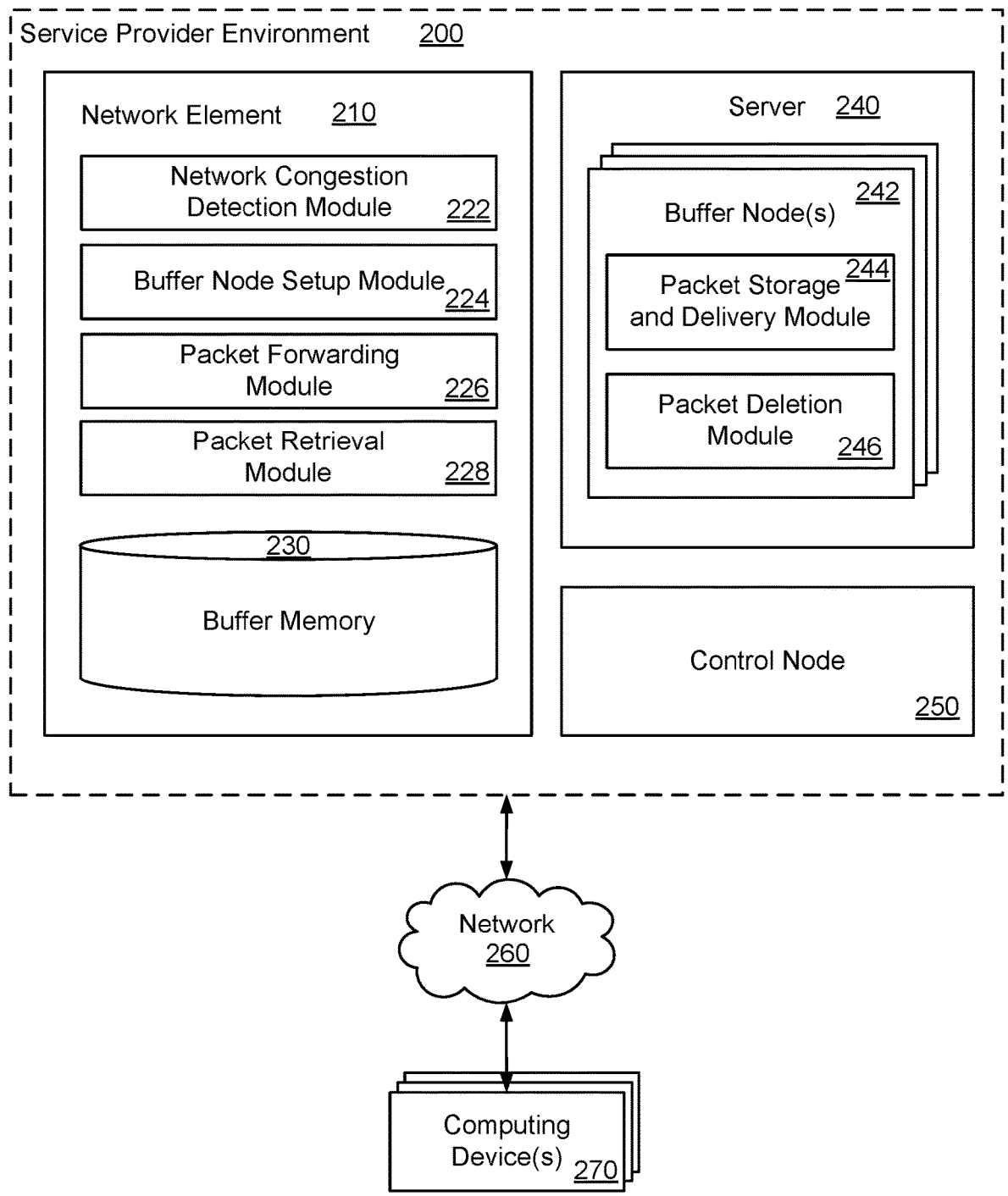
FIG. 2 is an illustration of a networked system for sending packets from a network element to a buffer node for temporary storage of the packets at the buffer node according to an example of the present technology.

FIG. 2 illustrates example components of the present technology in a service provider environment 200. The service provider environment 200 may include a network element 210. The network element 210 may include a physical network switch, a physical router, a firewall, a virtual network switch, a virtual network router, etc. The network element 210 may receive packets from a computing device 270 over a network 260. The network element 210 may send packets to one or more buffer nodes 242 for temporary storage of the packets at the buffer node(s) 242. The network element 210 may send packets to be remotely stored at the buffer node(s), as opposed to locally storing the packets at a buffer memory 230 in the network element 210. In other words, the buffer node(s) 242 may act as an external buffer memory for the network element 210.

The buffer node(s) 242 may operate on a server 240 in the service provider environment 200. In one example, the buffer node(s) 242 may be computing instances (e.g., hypervisor hosted computing instances or virtual instances). In addition, the buffer node(s) 242 may be assigned to store packets on behalf of the network element 210 by a control node 250 in the service provider environment 200.

The network element 210 may include a data store, such as a buffer memory 230. The buffer memory 230 may temporarily store packets received at the network element 210 (e.g., from the computing device). The packets may range in size from 100 bytes to 10 kilobytes (Kbs). For example, a buffer memory 230 may be used to temporarily store a packet while the network element 210 performs a lookup to determine an appropriate destination to route for the packet. The buffer memory 230 may be a fast access memory bank that is capable of storing and retrieving packets in a reduced amount of time. In one example, the buffer memory 230 may be capable of storing up network traffic received during a defined duration of. As a non-limiting example, the buffer memory 230 may store one second of network traffic for the network element 210, which may have 20 ports and each port may have a capacity of 100 gigabits per second (100G). Therefore, in this example, the buffer memory 230 may store up to 2 terabytes (TB) of data (i.e., 20×100G) at a given time.

The network element 210 in the service provider environment 200 may utilize a number of modules for analyzing and sending packets received at the network element 210 to the buffer node(s) 242 for temporary storage of the packets at the buffer node(s) 242. The network element 210 may include a network congestion detection module 222, a buffer node setup module 224, a packet forwarding module 226, a packet retrieval module 228, and other applications, services, processes, systems, engines, or functionality not discussed in detail.

The network congestion detection module 222 may be configured to detect when a data size of packets stored in the buffer memory 230 of the network element 210 exceeds a defined threshold. The network congestion detection module 222 may detect that the defined threshold is exceeded during network congestion or during a microburst of network traffic. The network congestion detection module 222 may detect when a packet queue in the buffer memory 230 of the network element 210 is filled to a local limit (or relatively close to the local limit). As a non-limiting example, the network congestion detection module 222 may detect when the buffer memory 230 is 90% full or 95% full.

The buffer node setup module 224 may be configured to send a request to the control node 250 to set up a logical connection to forward packets from the network element 210 to the buffer node 242 when the packets stored in the buffer memory 230 of the network element 210 exceeds the defined threshold for memory size. In other words, the buffer node setup module 224 may request access to the buffer node 242 for temporary storage of the packets at the buffer node 242 (as opposed to locally storing packets in the buffer memory 230 of the network element 210). The buffer node setup module 224 may receive an indication from the control node 250 of the buffer node 242 that is assigned to temporarily store packets on behalf of the network element 210. For example, the indication may include information (e.g., an address of the buffer node 242) that enables the network element 210 to send packets to the buffer node 242.

The packet forwarding module 226 may be configured to forward a packet to the buffer node 242 for temporary storage of the packet at the buffer node 242. The packet forwarding module 226 may forward the packet to the buffer node 242 to relieve overflow of the buffer memory 230 at the network element 210. The packet forwarding module 226 may forward additional subsequently received packets to the buffer node 242 until a data size of packets stored in the buffer memory 230 of the network element 210 is below the defined threshold. Alternatively, the packet forwarding module 226 may selectively forward certain packets to the buffer node 242 to relieve overflow at the buffer memory 230 of the network element 210.

The packet retrieval module 228 may be configured to send a request to the buffer node 242 to retrieve the packet from the buffer node 242 after a defined period of time. For example, the packet retrieval module 228 may send the request to retrieve the packet when a data size of packets stored in the buffer memory 230 has reduced to below the defined threshold. As an example, the packet retrieval module 228 may send the request to retrieve the packet a few seconds after sending the packet to the buffer node 242. In response to the request, the packet retrieval module 228 may receive the packet from the buffer node 242.

In one configuration, the buffer node(s) 242 may include a packet storage and delivery module 244 and a packet deletion module 246. The packet storage and delivery module 244 may receive packets from the network element 210, and then store the packets in a memory of the buffer node 242. In addition, upon a request from the network element 210, the packet storage and delivery module 244 may retrieve packets from the memory, and then deliver the packets back to the network element 210. The packet deletion module 246 may delete packets stored in the memory of the buffer node 242 when the packets have not been requested to be returned back to the network element 210 within a time limit. For example, when requests to return the packets have not been received within the time limit, the packets may be assumed to be stale and not useful to the network element 210. Therefore, the packet deletion module 246 may automatically delete these packets and clear space in the memory of the buffer node 242 to store additional packets that are received from the network element 210.

The computing devices 270 may be, for example, processor-based systems or embedded systems. The computing devices 270 may include, but are not limited to, a desktop computer, laptop or notebook computer, tablet computer, handheld computer, workstation, network computer, or other devices with like capability.

The various processes and/or other functionality contained within the service provider environment 200 may be executed on one or more processors that are in communication with one or more memory modules. The service provider environment 200 may include a number of computing devices that are arranged, for example, in one or more server banks or computer banks or other arrangements. The computing devices may support a computing environment using hypervisors, virtual machine managers (VMMs) and other virtualization software.

The term "data store" may refer to any device or combination of devices capable of storing, accessing, organizing and/or retrieving data, which may include any combination and number of data servers, relational databases, object oriented databases, cluster storage systems, data storage devices, data warehouses, flat files and data storage configuration in any centralized, distributed, or clustered environment. The storage system components of the data store may include storage systems such as a SAN (Storage Area Network), a virtualized storage network, volatile or non-volatile RAM, optical media, or hard-drive type media. The data store may be representative of a plurality of data stores as can be appreciated.

The network 260 may include any useful computing network, including an intranet, the Internet, a localized network, a wide area network, a wireless data network, or any other such network or combination thereof. Components utilized for such a system may depend at least in part upon the type of network and/or environment selected. Communication over the network may be enabled by wired or wireless connections and combinations thereof.

FIG. 2 illustrates that certain processing modules may be discussed in connection with this technology and these processing modules may be implemented as computing services. In one example configuration, a module may be considered a service with one or more processes executing on a server or other computer hardware. Such services may be centrally hosted functionality or a service application that may receive requests and provide output to other services or consumer devices. For example, modules providing services may be considered on-demand computing that are hosted in a server, virtualized service environment, grid or cluster computing system. An API may be provided for each module to enable a second module to send requests to and receive output from the first module. Such APIs may also allow third parties to interface with the module and make requests and receive output from the modules. While FIG. 2 illustrates an example of a system that may implement the techniques above, many other similar or different environments are possible. The example environments discussed and illustrated above are merely representative and not limiting.

Figure 3:
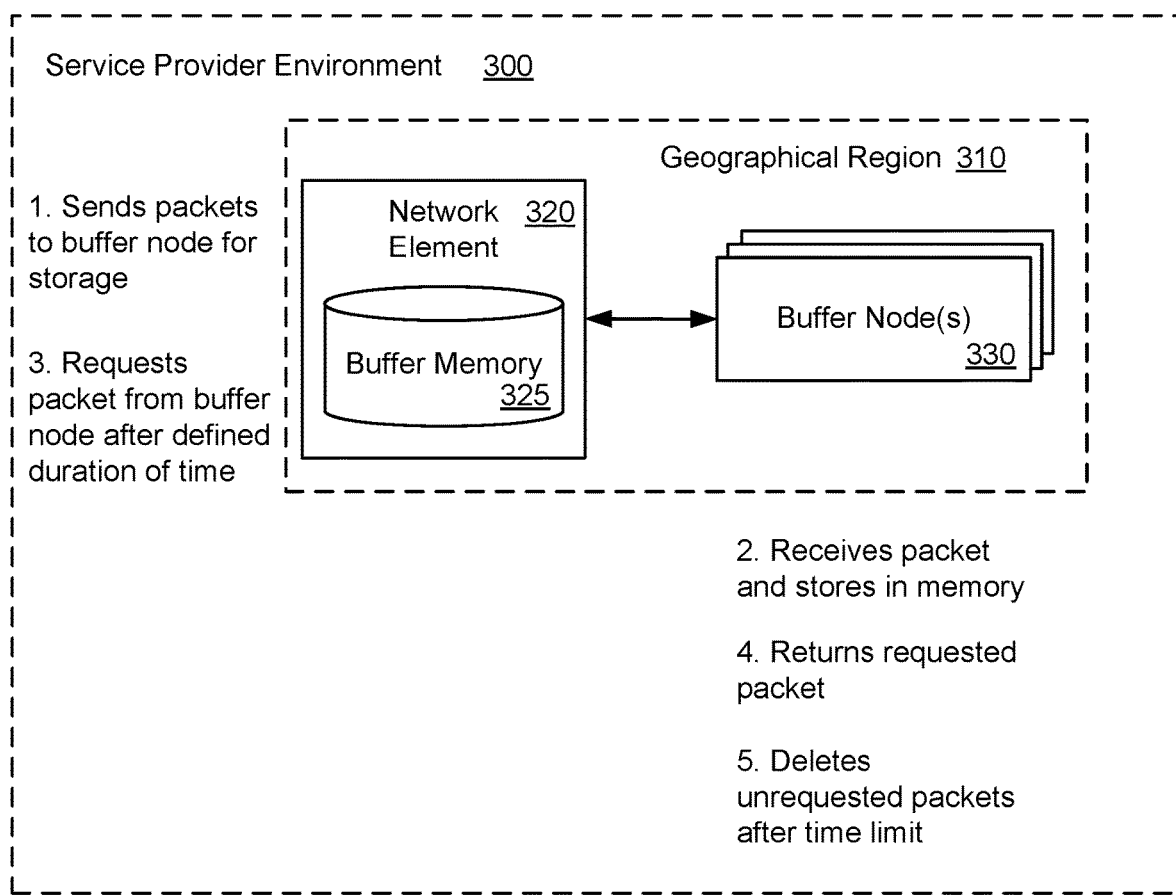
FIG. 3 illustrates a system and related operations for retrieving packets from a buffer node at a network element according to an example of the present technology.

FIG. 3 illustrates an exemplary system and related operations for retrieving packets from a buffer node 330 at a network element 320. The network element 320 and the buffer node 330 may be located in a same geographical region 310 within a service provider environment 300. The network element 320 may send a packet to the buffer node 330 for remote storage of the packet at the buffer node 330, rather than locally storing the packet in a buffer memory 325 in the network element 320. The buffer node 330 may receive the packet from the network element 320, and then store the packet in a memory of the buffer node 330. After a defined event or a defined duration of time (e.g., a few seconds), the network element 320 may send a request to the buffer node 330 to return the packet back to the network element 320. For example, the network element 320 may send the request when a data size of packets stored in the buffer memory 325 is below a defined threshold (e.g., when the buffer memory 325 is 90% full). In an alternative example, the network element 320 may send a request after 200 milliseconds to return a group of packets back to the network element 320. The buffer node 330 may receive the request, and the buffer node 330 may retrieve the requested packet (or the group of requested packets) from the memory in the buffer node 330. The buffer node 330 may return the packet(s) to the network element 320 in accordance with the request.

In one example, a packet received from the buffer node 330 may include a flag indicating that the packet was previously sent from the network element 320 to the buffer node 330. The flag may indicate to the network element 320 that the packet is not a new packet, but rather a packet that was previously forwarded to the network element 320. The network element 320 may process the packet in a certain manner based on the flag. For example, the network element 320 may route or direct the packet with the flag to an appropriate destination in a manner that is distinguishable from packets that do not include the flag.

In one configuration, the buffer node 330 may delete certain packets stored in the memory of the buffer node 330 when the packets have not been requested to be returned back to the network element 320 within a time limit. The network element 320 may not send a request for packets when network congestion has not ceased at the network element 320. In other words, due to network congestion, the network element 320 may be unable to process packets and a likelihood of the network element 320 dropping packets may be increased. As a result, the network element 320 may not send the request to retrieve the packets from the buffer node 330. In this case, when explicit requests to return the packets have not been received within the time limit, the buffer node 330 may assume that the packets are stale and not useful to the network element 210. The buffer node 330 may automatically delete these packets and clear space in the memory of the buffer node 330 to store additional packets that are received from the network element 320. It may be advantageous to delete or drop the packets at the buffer node 330, as this may reduce an amount of traffic coming back to the network element 320. For example, when the packets have been stored in the buffer node for more than a few minutes, then the packets may be deleted.

In one example, the time limit for deleting the packet at the buffer node 330 may be based on a type of packet. For example, the buffer node 330 may manage separate time limits for distinct types of packets, such as user datagram protocol (UDP) packets, transmission control protocol (TCP) packets, increased priority packets or reduced priority packets. As an example, an increased priority packet may become stale more quickly than a reduced priority packet, so a time limit for deleting the increased priority packet may be less than a time limit for deleting the reduced priority packet.

Figure 4:
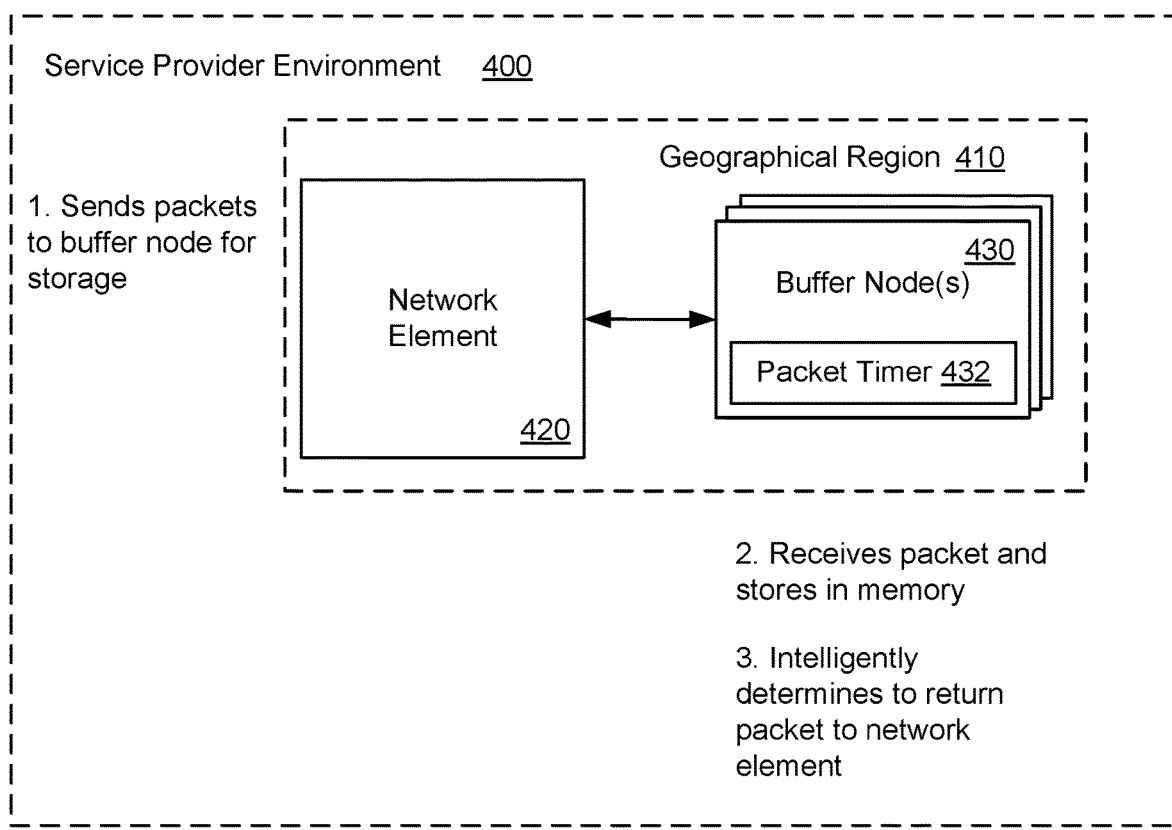
FIG. 4 illustrates a system and related operations for returning packets from a buffer node to a network element according to an example of the present technology.

FIG. 4 illustrates an exemplary system and related operations for returning packets from a buffer node 430 to a network element 420. The network element 420 and the buffer node 430 may be located in a same geographical region 410 within a service provider environment 400. The network element 420 may send a packet to the buffer node 430. The buffer node 430 may receive the packet from the network element 420, and then store the packet in a memory of the buffer node 430. In one example, the buffer node 430 may make an intelligent decision to return the packet back to the network element 420 after a duration of time (e.g., 100 ms), and the buffer node 430 may not wait to receive an explicit request for the packet from the network element 420. For example, the buffer node 430 may intelligently return the packet after the duration of time based on a packet timer 432, which may be defined depending on the type of packet (e.g., UDP packet, TCP packet, increased priority packet or reduced priority packet). For example, the packet timer 432 may be defined to expire more quickly for an increased priority packet as compared to a reduced priority packet (as an increased priority packet may become stale more quickly than the reduced priority packet).

Figure 5:
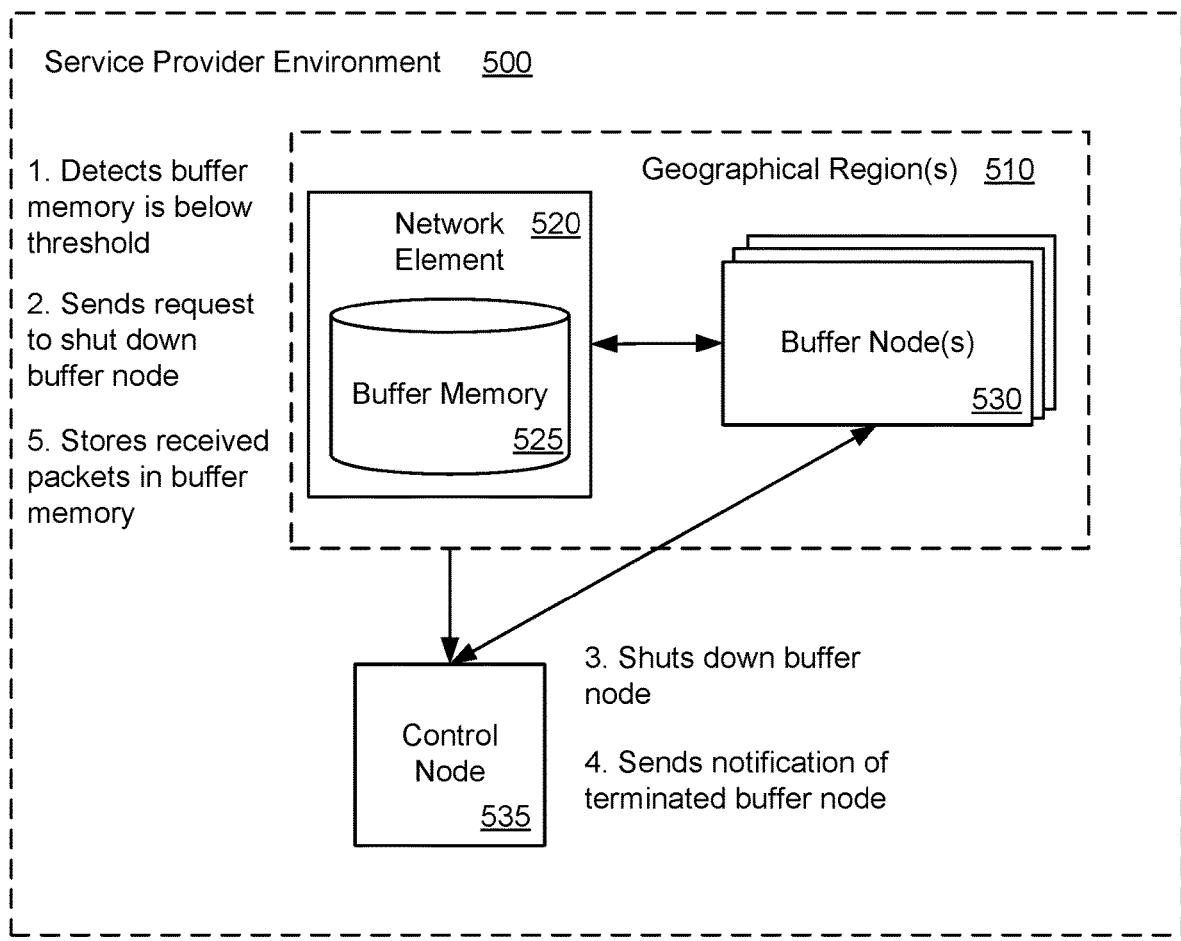
FIG. 5 illustrates a system and related operations for shutting down a buffer node that stores packets for a network element according to an example of the present technology.

FIG. 5 illustrates an exemplary system and related operations for shutting down a buffer node 530 that stores packets for a network element 520. The network element 520 and the buffer node 530 may be located in a same geographical region 510 within a service provider environment 500. The network element 520 may detect when a data size of packets stored in a buffer memory 525 of the network element 520 is less than a defined threshold. For example, the data size of the packets stored in the buffer memory 525 may be less than the defined threshold after network congestion has ceased at the network element 520 or after a microburst occurs at the network element 520. The network element 520 may send a request to a control node 535 (or control service) in the service provider environment 500 to shut down the buffer node 530 that is currently storing packets on behalf of the network element 520. In other words, the network element 520 may notify the control node 535 that the data size of the packets stored in the buffer memory 525 is less than the defined threshold, and that the buffer node 530 is no longer useful for offloading packets from the network element 520. In response to the request, the control node 535 may shut down the buffer node 530. For example, the control node 535 may instruct the network element 520 to stop sending subsequent packets to the buffer node 530. In one configuration, the control node 535 may wait until all packets that were initially received from the network element 520 are returned from the buffer node 530 back to the network element 520 or deleted from the buffer node 530, and then the control node 535 may shut down the buffer node 530. The control node 535 may shut down or terminate the buffer node 530 to avoid unnecessarily dropping packets at the buffer node 530 that have yet to be returned to the network element 520. The control node 535 may send a notification after the buffer node 530 has been shut down or terminated. At this point, the network element 520 may begin locally storing subsequent packets in the buffer memory 525 of the network element 520.

Figure 6:
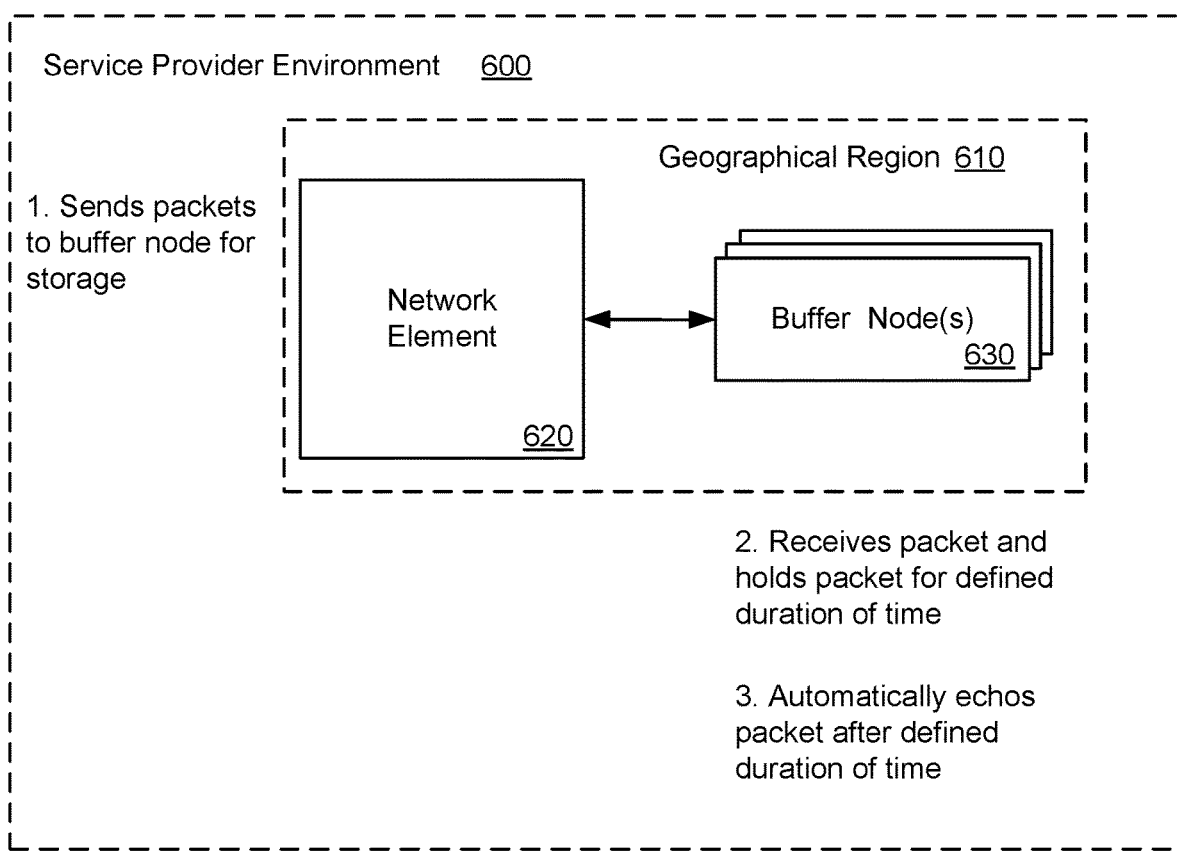
FIG. 6 illustrates a system and related operations for returning packets from a buffer node to a network element according to an example of the present technology.

FIG. 6 illustrates an exemplary system and related operations for returning packets from a buffer node 630 to a network element 620. The network element 620 and the buffer node 630 may be located in a same geographical region 610 within a service provider environment 600. The network element 620 may send a packet for storage at the buffer node 630. The buffer node 630 may receive the packet and hold the packet for a defined duration of time at the buffer node 630. In one example, the buffer node 630 may hold the packet without storing the packet at the buffer node 630. The buffer node 630 may automatically return the packet back to the network element 620 after the defined duration of time without an explicit request for the packet from the network element 620. In this configuration, the buffer node 630 may receive the packet and echo the packet back to the network element 620 after the defined duration of time. The buffer node 630 may wait for the defined duration of time before echoing the packet to allow congestion at the network element 620 to cease.

Figure 7:
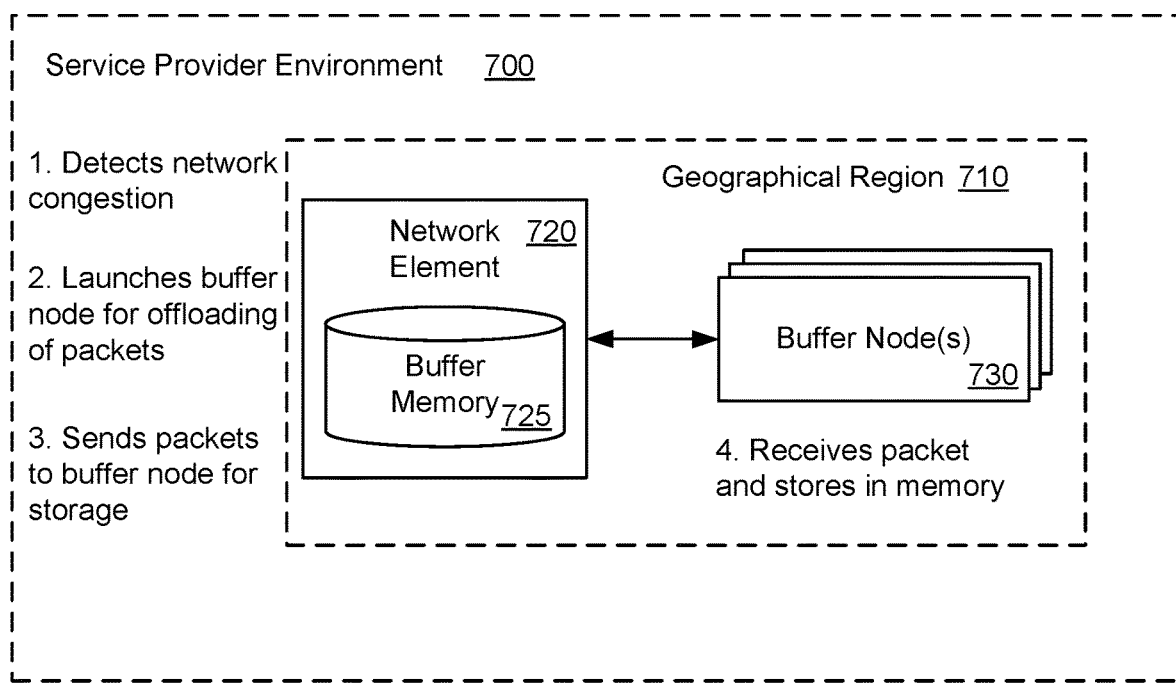
FIG. 7 illustrates a system and related operations for launching a buffer node from a network element to temporarily store packets for the network element according to an example of the present technology.

FIG. 7 illustrates an exemplary system and related operations for launching a buffer node 730 from a network element 720 to store packets for the network element 720. The network element 720 and the buffer node 730 may be located in a same geographical region 710 within a service provider environment 700. The network element 720 may detect when a data size of packets stored in a buffer memory 725 of the network element 720 is greater than a defined threshold. The network element 720 may launch the buffer node 730 to offload storage of packets from the network element 720 to the buffer node 730. In this example, the network element 720 may have the proper rights and credentials to directly launch the buffer node 730 in the service provider environment 700 (rather than requesting a control node or control service to assign a buffer node). After the buffer node 730 is launched, the network element 720 may begin sending packets to the buffer node 730, and the buffer node 730 may temporarily store received packets in a memory of the buffer node 730.

Figure 8:
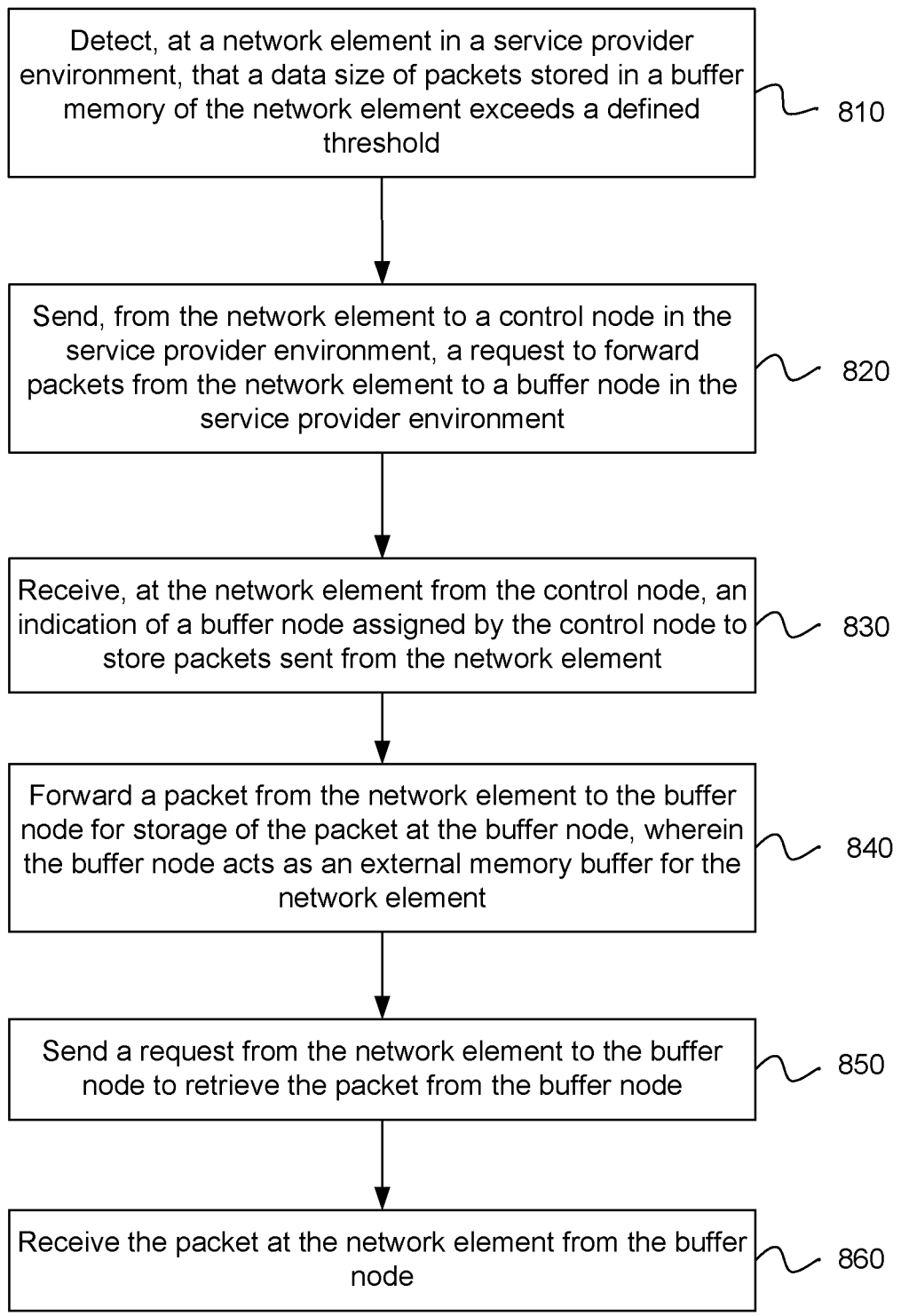
FIG. 8 is a flowchart of an example method for forwarding packets from a network element to a buffer node for temporary storage of the packets at the buffer node.

FIG. 8 illustrates an example of a method for forwarding packets from a network element to a buffer node for storage of the packets at the buffer node. A network element in a service provider environment may detect that a data size of packets stored in a buffer memory of the network element exceeds a defined threshold, as in block 810. For example, the network element may detect that the data size of the packets stored in the buffer memory exceeds the defined threshold during network congestion or during a burst of network traffic.

The network element may send, to a control node in the service provider environment, a request to forward packets from the network element to a buffer node in the service provider environment when the packets stored in the buffer memory of the network element exceeds the defined threshold for memory size, as in block 820. In other words, the network element may send the request to offload a temporary storage of packets from the buffer memory of the network element to the buffer node to avoid buffer memory overflow at the network element.

The network element may receive from the control node an indication of a buffer node assigned by the control node to store packets received from the network element, as in block 830. For example, the control node may identify or launch a buffer node to act as an external buffer memory for the network element, and then the control node may provide the indication of the buffer node to the network element. The indication may include information that enables the network element to direct packets to the buffer node.

A packet may be forwarded from the network element to the buffer node for storage of the packet at the buffer node, as in block 840. For example, the packet may be received at the network element, and rather than storing the packet in the buffer memory of the network element, the network element may forward the packet to the buffer node. In one example, the network element may forward the packet to the buffer node via a dedicated port or a prioritized port of the network element that is selected for use when the data size of the packets stored in the buffer memory exceeds the defined threshold. In another example, the network element may determine that the packet received at the network element is associated with an increased priority level, and forward the packet to the buffer node when the packet is associated with the increased priority level.

A request may be sent from the network element to the buffer node to retrieve the packet from the buffer node after a defined period of time, as in block 850. For example, the network element may send the request to the buffer node to retrieve the packet when a data size of packets stored in the buffer memory has reduced to below the defined threshold.

The packet may be received at the network element from the buffer node, as in block 860. The packet may be received at the network element in response to the request that was previously sent from the network element to retrieve the packet from the buffer node. The packet received from the buffer node may include a flag indicating that the packet was previously sent from the network element to the buffer node.

In one configuration, the network element may detect that a data size of packets stored in the buffer memory of the network element is less than the defined threshold. The network element may notify the control node that the data size of the packets stored in the buffer memory is less than the defined threshold to cause the control node to gradually shut down the buffer node. The network element may store subsequent packets received at the network element in the buffer memory of the network element.

In one example, the network element may include a physical network switch, a physical router, a firewall, a virtual network switch or a virtual network router. In another example, the network element may be located within a same geographical region as the buffer node to minimize latency when packets travel between the network element and the buffer node. A number of hops between the network element and the buffer node located within the same geographical region may be below a defined threshold.

Figure 9:
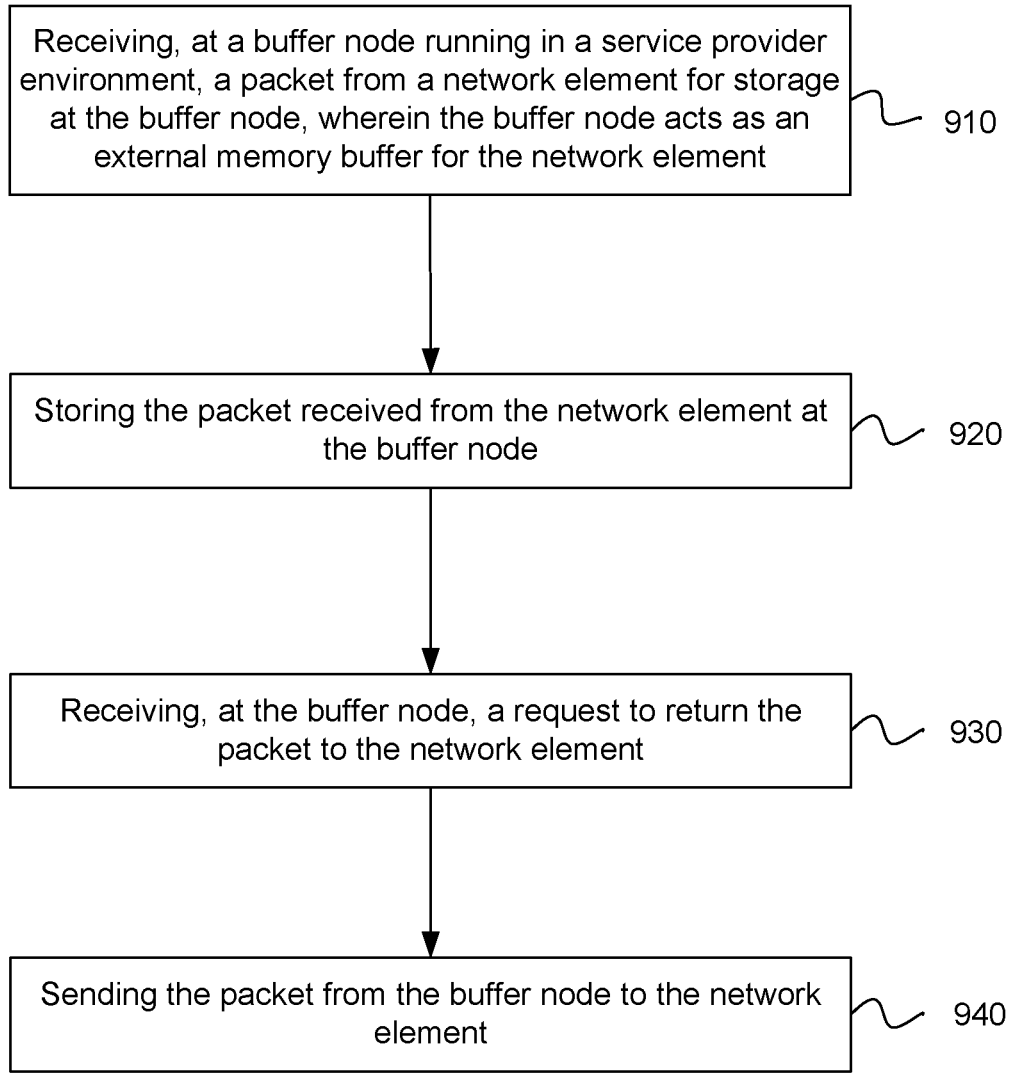
FIG. 9 is a flowchart of an example method for temporarily storing packets received from a network element at a buffer node.

FIG. 9 illustrates an example of a method for storing packets received from a network element at a buffer node. The network element and/or the buffer node may be located in a service provider environment. The buffer node may receive a packet from the network element for storage of the packet in the buffer node, as in block 910. The buffer node may act as an external buffer memory for the network element. Alternatively, the buffer node may act as an external buffer memory for multiple network elements in the service provider environment.

The packet received from the network element may be stored at the buffer node, as in block 920. For example, the packet may be stored in a memory of the buffer node. The buffer node may be able to store an increased number of packets as compared to the network element. In one example, the buffer node may be replaced with a buffer node with increased memory or a buffer node with decreased memory depending on network traffic conditions.

A request may be received at the buffer node from the network element after a defined period of time to return the packet back to the network element, as in block 930. For example, the buffer node may receive the request to return the packet when a data size of packets stored in a buffer memory of the network element has reduced to below a defined threshold.

The packet may be sent from the buffer node to the network element, as in block 940. The packet may be sent to the network element in response to receiving the request from the network element. In an alternative configuration, the buffer node may return the packet to the buffer node without an explicit request from the network element to retrieve the packet from the buffer node. In addition, the packet may be deleted at the buffer node when the packet is not requested to be returned back to the network element within a time limit.

Figure 10:
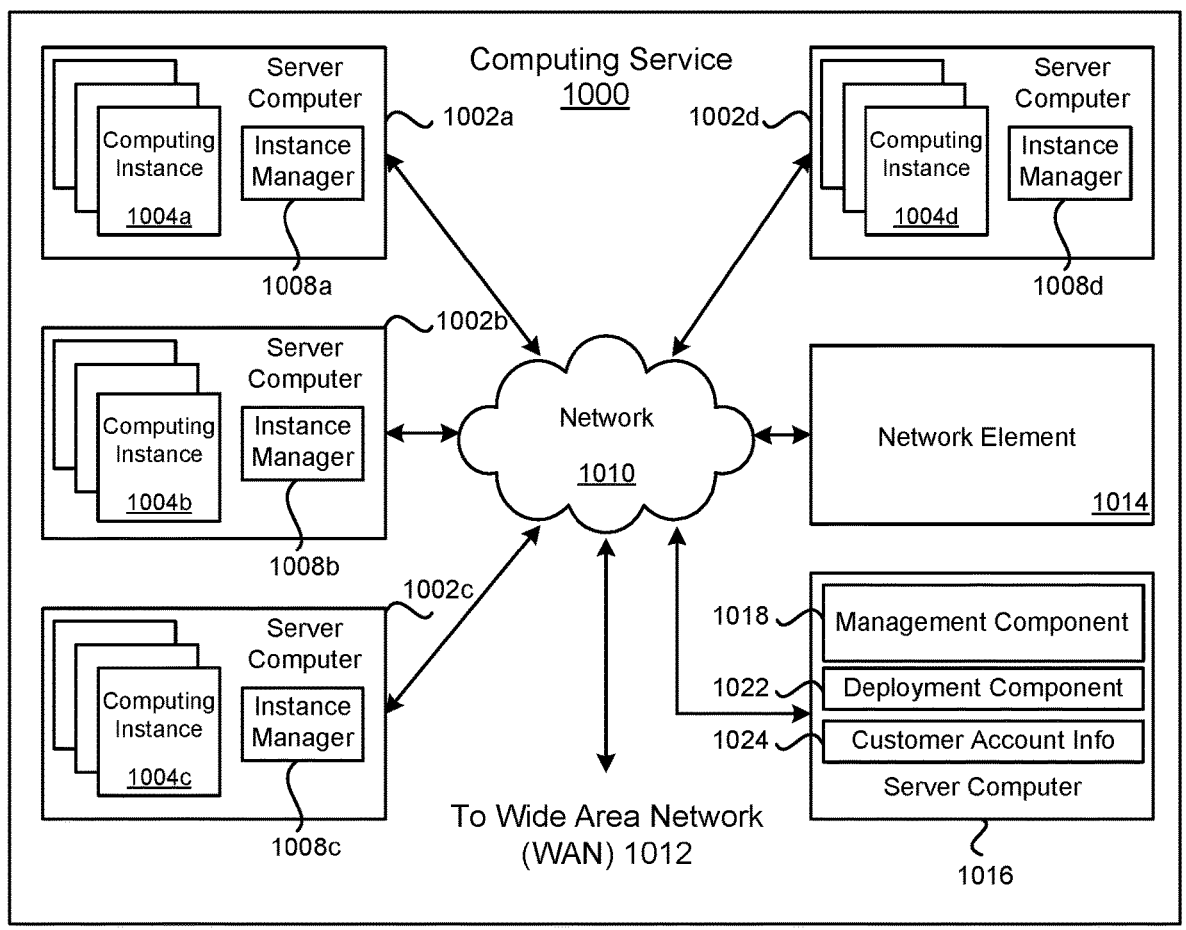
FIG. 10 is a block diagram of a service provider environment according to an example of the present technology.

FIG. 10 is a block diagram illustrating an example computing service 1000 that may be used to execute and manage a number of computing instances 1004*a-d* upon which the present technology may execute. In particular, the computing service 1000 depicted illustrates one environment in which the technology described herein may be used. The computing service 1000 may be one type of environment that includes various virtualized service resources that may be used, for instance, to host computing instances 1004*a-d*.

The computing service 1000 may be capable of delivery of computing, storage and networking capacity as a software service to a community of end recipients. In one example, the computing service 1000 may be established for an organization by or on behalf of the organization. That is, the computing service 1000 may offer a "private cloud environment." In another example, the computing service 1000 may support a multi-tenant environment, wherein a plurality of customers may operate independently (i.e., a public cloud environment). Generally speaking, the computing service 1000 may provide the following models: Infrastructure as a Service ("IaaS"), Platform as a Service ("PaaS"), and/or Software as a Service ("SaaS"). Other models may be provided. For the IaaS model, the computing service 1000 may offer computers as physical or virtual machines and other resources. The virtual machines may be run as guests by a hypervisor, as described further below. The PaaS model delivers a computing platform that may include an operating system, programming language execution environment, database, and web server.

Application developers may develop and run their software solutions on the computing service platform without incurring the cost of buying and managing the underlying hardware and software. The SaaS model allows installation and operation of application software in the computing service 1000. End customers may access the computing service 1000 using networked client devices, such as desktop computers, laptops, tablets, smartphones, etc. running web browsers or other lightweight client applications, for example. Those familiar with the art will recognize that the computing service 1000 may be described as a "cloud" environment.

The particularly illustrated computing service 1000 may include a plurality of server computers 1002a-d. The server computers 1002a-d may also be known as physical hosts. While four server computers are shown, any number may be used, and large data centers may include thousands of server computers. The computing service 1000 may provide computing resources for executing computing instances 1004a-d. Computing instances 1004a-d may, for example, be virtual machines. A virtual machine may be an instance of a software implementation of a machine (i.e. a computer) that executes applications like a physical machine. In the example of a virtual machine, each of the server computers 1002a-d may be configured to execute an instance manager 1008a-d capable of executing the instances. The instance manager 1008a-d may be a hypervisor, virtual machine manager (VMM), or another type of program configured to enable the execution of multiple computing instances 1004a-d on a single server. Additionally, each of the computing instances 1004a-d may be configured to execute one or more applications.

A network element 1014 in the computing service 1000 may implement the present technology. For example, the network element 1014 may detect that a data size of packets stored in a buffer memory of the network element 1014 exceeds a defined threshold. The network element 1014 may send to a control node in the computing service 1000 a request to forward packets from the network element 1014 to one of the computing instances 1004a-d in the computing service 1000 when the packets stored in the buffer memory of the network element 1014 exceeds the defined threshold for memory size. The network element 1014 may receive from the control node an indication of one of the computing instances 1004a-d assigned by the control node to store packets received from the network element 1014. The network element 1014 may forward a packet to one of the computing instances 1004a-d for storage of the packet. The computing instances 1004a-d may act as an external buffer memory for the network element 1014. The network element 1014 may send a request to one of the computing instances 1004a-d to retrieve the packet after a defined period of time. The network element 1014 may receive the packet from one of the computing instances 1004a-d.

A server computer 1016 may execute a management component 1018. A customer may access the management component 1018 to configure various aspects of the operation of the computing instances 1004a-d purchased by a customer. For example, the customer may setup computing instances 1004a-d and make changes to the configuration of the computing instances 1004a-d.

A deployment component 1022 may be used to assist customers in the deployment of computing instances 1004a-d. The deployment component 1022 may have access to account information associated with the computing instances 1004a-d, such as the name of an owner of the account, credit card information, country of the owner, etc. The deployment component 1022 may receive a configuration from a customer that includes data describing how computing instances 1004a-d may be configured. For example, the configuration may include an operating system, provide one or more applications to be installed in computing instances 1004a-d, provide scripts and/or other types of code to be executed for configuring computing instances 1004a-d, provide cache logic specifying how an application cache is to be prepared, and other types of information. The deployment component 1022 may utilize the customer-provided configuration and cache logic to configure, prime, and launch computing instances 1004a-d. The configuration, cache logic, and other information may be specified by a customer accessing the management component 1018 or by providing this information directly to the deployment component 1022.

Customer account information 1024 may include any desired information associated with a customer of the multi-tenant environment. For example, the customer account information may include a unique identifier for a customer, a customer address, billing information, licensing information, customization parameters for launching instances, scheduling information, etc. As described above, the customer account information 1024 may also include security information used in encryption of asynchronous responses to API requests. By "asynchronous" it is meant that the API response may be made at any time after the initial request and with a different network connection.

A network 1010 may be utilized to interconnect the computing service 1000 and the server computers 1002a-d, 1016. The network 1010 may be a local area network (LAN) and may be connected to a Wide Area Network (WAN) 1012 or the Internet, so that end customers may access the computing service 1000. In addition, the network 1010 may include a virtual network overlaid on the physical network to provide communications between the servers 1002a-d. The network topology illustrated in FIG. 10 has been simplified, as many more networks and networking devices may be utilized to interconnect the various computing systems disclosed herein.

Figure 11:
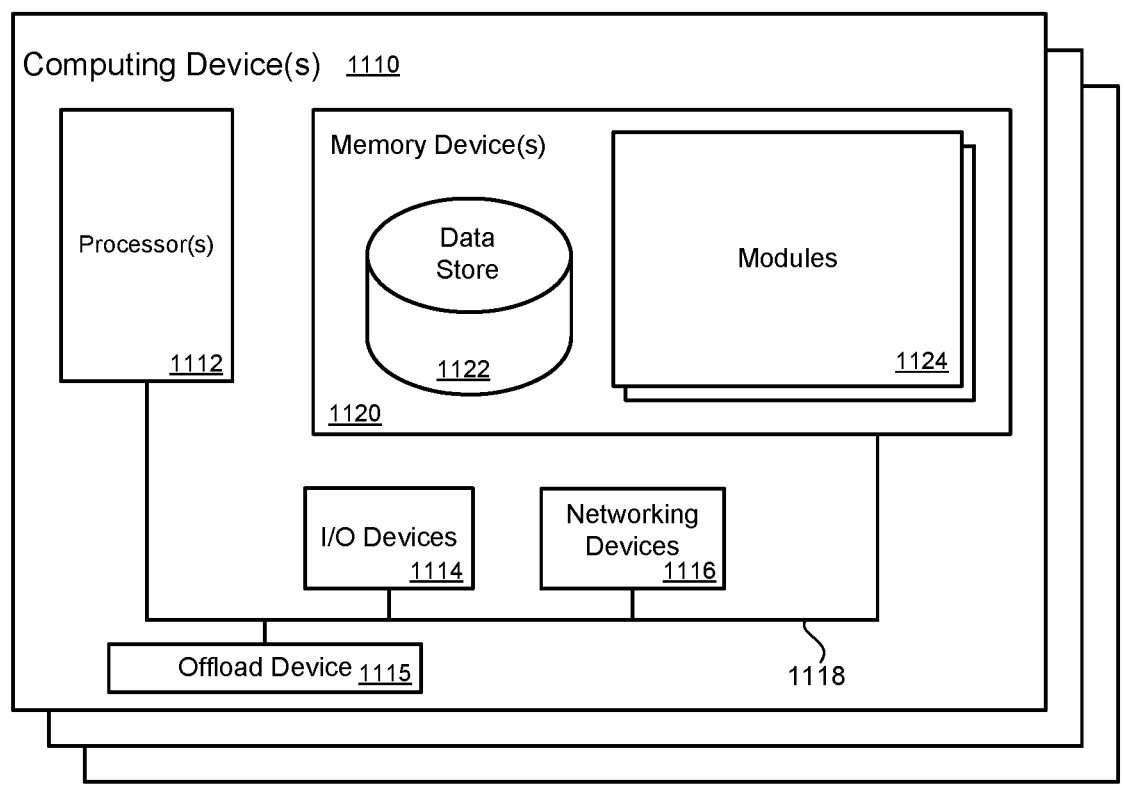
FIG. 11 is a block diagram that provides an example illustration of a computing device that may be employed in the present technology.

FIG. 11 illustrates a computing device 1110 on which modules or code components of this technology may execute. A computing device 1110 is illustrated on which a high level example of the technology may be executed. The computing device 1110 may include one or more processors 1112 that are in communication with memory devices 1120. The computing device may include a local communication interface 1118 for the components in the computing device 1110. For example, the local communication interface may be a local data bus and/or any related address or control busses as may be desired.

The memory device 1120 may contain modules 1124 or code components that are executable by the processor(s) 1112 and data for the modules 1124. The modules 1124 may execute the functions described earlier. A data store 1122 may also be located in the memory device 1120 for storing data related to the modules 1124 and other applications along with an operating system that is executable by the processor(s) 1112.

Other applications may also be stored in the memory device 1120 and may be executable by the processor(s) 1112. Components or modules discussed in this description that may be implemented in the form of software using high programming level languages that are compiled, interpreted or executed using a hybrid of the methods.

The computing device 1110 may also have access to I/O (input/output) devices 1114 that are usable by the computing devices. An example of an I/O device is a display screen that is available to display output from the computing devices. Other known I/O device may be used with the computing device 1110 as desired. Networking devices 1116 and similar communication devices may be included in the computing device. The networking devices 1116 may be wired or wireless networking devices that connect to the internet, a LAN, WAN, or other computing network. In addition, an offload device 1115 may be included in the computing device 1110. The offload device 1115 may be a network card or expansion card, and the offload device 1115 may include a fixed amount of memory and be able to execute a buffering process or application.

The components or modules that are shown as being stored in the memory device 1120 may be executed by the processor 1112. The term "executable" may mean a program file that is in a form that may be executed by a processor 1112. For example, a program in a higher level language may be compiled into machine code in a format that may be loaded into a random access portion of the memory device 1120 and executed by the processor 1112, or source code may be loaded by another executable program and interpreted to generate instructions in a random access portion of the memory to be executed by a processor. The executable program may be stored in any portion or component of the memory device 1120. For example, the memory device 1120 may be random access memory (RAM), read only memory (ROM), flash memory, a solid state drive, memory card, a hard drive, optical disk, floppy disk, magnetic tape, or any other memory components.

The processor 1112 may represent multiple processors and the memory 1120 may represent multiple memory units that operate in parallel to the processing circuits. This may provide parallel processing channels for the processes and data in the system. The local interface 1118 may be used as a network to facilitate communication between any of the multiple processors and multiple memories. The local interface 1118 may use additional systems designed for coordinating communication such as load balancing, bulk data transfer, and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The modules may be passive or active, including agents operable to perform desired functions.

The technology described here can also be stored on a computer readable storage medium that includes volatile and non-volatile, removable and non-removable media implemented with any technology for the storage of information such as computer readable instructions, data structures, program modules, or other data. Computer readable storage media include, but is not limited to, RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which can be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media. The term computer readable media as used herein includes communication media.

Reference was made to the examples illustrated in the drawings, and specific language was used herein to describe the same. It will nevertheless be understood that no limitation of the scope of the technology is thereby intended. Alterations and further modifications of the features illustrated herein, and additional applications of the examples as illustrated herein, which would occur to one skilled in the relevant art and having possession of this disclosure, are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. One skilled in the relevant art will recognize, however, that the technology can be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements can be devised without departing from the spirit and scope of the described technology.

What is claimed is:

1. A system, comprising:
   at least one processor;
   at least one memory device including a data store to store a plurality of data and instructions that, when executed, cause the system to:
   detect, at a network element in a service provider environment, that a data size of packets stored in a buffer memory of the network element exceeds a defined threshold;
   send, from the network element to a control node in the service provider environment, a request to forward packets from the network element to a buffer node in the service provider environment;
   receive, at the network element and from the control node, an indication of a buffer node assigned by the control node to store packets sent from the network element;
   forward a packet from the network element to the buffer node for storage of the packet at the buffer node, wherein the buffer node acts as an external buffer memory for the network element, and the buffer node includes an adjustable number of computing instances in the service provider environment depending on a current level of network traffic that flows through the network element;
   send a request from the network element to the buffer node to retrieve the packet from the buffer node; and
   receive the packet at the network element from the buffer node.

2. The system of claim 1, wherein the plurality of data and instructions, when executed, cause the system to:
   detect that the data size of packets stored in the buffer memory of the network element is less than the defined threshold;
   notify the control node that the data size of the packets stored in the buffer memory is less than the defined threshold;
   send a request to the control node to shut down the buffer node; and
   store subsequent packets received at the network element in the buffer memory of the network element.

3. The system of claim 1, wherein the plurality of data and instructions, when executed, cause the system to forward the packet to the buffer node via a dedicated port or a prioritized port of the network element that is selected for use when the data size of the packets stored in the buffer memory exceeds the defined threshold.

4. The system of claim 1, wherein the plurality of data and instructions, when executed, cause the system to:
   determine that the packet received at the network element is associated with an increased priority level; and
   as a result of the determining, forward the packet to the buffer node.

5. A method, comprising:
   receiving a packet at a network element;
   determining that packets stored in a buffer memory of the network element exceed a defined threshold for data size;
   forwarding the packet from the network element to a buffer node in a service provider environment for storage of the packet at the buffer node, wherein the buffer node acts as an external buffer memory for the network element, and the buffer node includes an adjustable number of computing instances in the service provider environment depending on a current level of network traffic that flows through the network element; and
   receiving the packet at the network element from the buffer node.

6. The method of claim 5, further comprising:
   requesting a control node in the service provider environment to assign a buffer node in the computing service environment to store packets received from the network element; and
   receiving, from the control node, an indication of the buffer node assigned by the control node to store packets received from the network element.

7. The method of claim 5, further comprising selecting, at the network element, the buffer node in the service provider environment for storage of the packet at the buffer node when the packets stored in the buffer memory exceeds the defined threshold for data size.

8. The method of claim 5, further comprising sending a request from the network element to the buffer node to retrieve the packet from the buffer node.

9. The method of claim 5, further comprising receiving the packet automatically from the buffer node after the defined period of time without an explicit request from the network element to retrieve the packet from the buffer node.

10. The method of claim 5, further comprising selecting one of multiple buffer nodes in the service provider environment to forward the packet when the packets stored in the buffer memory exceeds the defined threshold for data size, wherein a number of buffer nodes that store packets for the network element is increased or decreased depending on a congestion level of the network element.

11. The method of claim 5, wherein the network element is located within a same geographical region as the buffer node.

12. The method of claim 5, wherein the network element is selected from a group consisting of: a physical network switch, a physical router, or a firewall.

13. The method of claim 5, wherein the network element is selected from a group consisting of: a virtual network switch, or a virtual network router.

14. The method of claim 5, wherein the packet, when received from the buffer node, includes a flag indicating that the packet was previously sent from the network element to the buffer node.

15. A non-transitory machine readable storage medium having instructions embodied thereon, the instructions being executable by one or more processors to perform acts comprising:
   receiving, at a buffer node running in a service provider environment, a packet from a network element for storage in the buffer node, wherein the buffer node acts as an external buffer memory for the network element when a data size of packets stored in a buffer memory of the network element exceeds a defined threshold, and the buffer node includes an adjustable number of computing instances in the service provider environment depending on a current level of network traffic that flows through the network element;

storing the packet received from the network element at the buffer node;

receiving, at the buffer node, a request to return the packet to the network element; and sending the packet from the buffer node to the network element.

16. The non-transitory machine readable storage medium of claim 15, the acts further comprising deleting packets at the buffer node when the packets are not requested to be returned back to the network element within a time limit.

17. The non-transitory machine readable storage medium of claim 16, wherein the time limit for deleting the packet is based on a type of packet, wherein the type of packet is selected from a group consisting of: a user datagram protocol (UDP) packet, a transmission control protocol (TCP) packet, an increased priority packet, or a reduced priority packet.

18. The non-transitory machine readable storage medium of claim 15, wherein the buffer node is launched by a control node in the service provider environment when packets stored in a buffer memory of the network element exceed a defined threshold for memory size.

19. The non-transitory machine readable storage medium of claim 15, wherein the buffer node is launched by a control node in the service provider environment based on an expected traffic pattern in the service provider environment.

20. The non-transitory machine readable storage medium of claim 15, wherein the buffer node acts as an external buffer memory for multiple network elements in the service provider environment.

\* \* \* \* \*